March 10, 1959     J. W. BENTLEY     2,876,956

PEPPER MILL FOR TABLE USE AND THE LIKE

Filed Feb. 13, 1956

INVENTOR
JOHN W. BENTLEY
BY
                  ATTORNEYS

United States Patent Office 2,876,956
Patented Mar. 10, 1959

2,876,956

PEPPER MILL FOR TABLE USE AND THE LIKE

John W. Bentley, San Pablo, Calif.

Application February 13, 1956, Serial No. 565,200

1 Claim. (Cl. 241—169)

This invention relates to pepper mills adapted for pulverizing or grinding peppercorns and dispensing the ground pepper, and is more particularly directed towards improvements over the pepper mill construction disclosed in my prior Patent 2,683,566, issued July 13, 1954.

Manually operated pepper mills have become increasingly popular in recent years due to the desire of persons to have a ready source of freshly ground pepper to be distributed on various articles of food. A pepper mill designed to provide the above features is disclosed in the above mentioned patent, but after considerable experimentation it has been ascertained that such a pepper mill, as well as other mills available in the trade, possesses certain shortcomings or features of disadvantage which reduce their efficiency and value to the user.

Accordingly, it is an object of the present invention to provide a manually operated pepper mill for table use and the like in which the peppercorns to be ground are maintained in whole condition until a supply of ground pepper is desired by the user, whereby a fresh charge of ground pepper may always be obtained.

A further object of the invention is to provide a pepper mill of the type described in which all of the ground pepper will be discharged upon actuation of the mill so as to avoid the trapping of ground pepper particles within the mill.

Yet another object of the invention is to provide a device of the type above described which is extremely easy in operation, which will avoid jamming of the grinding or actuating mechanism, and which will insure the production of small particles or chips of pepper.

A further object of the invention is to provide a pepper mill as above defined in which improved loading means for the peppercorns are provided so that new charges of material may be readily inserted within the mill for subsequent grinding.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawing and description may be adopted within the scope of the invention as set forth in the claims.

Referring to said drawing.

Figure 1:
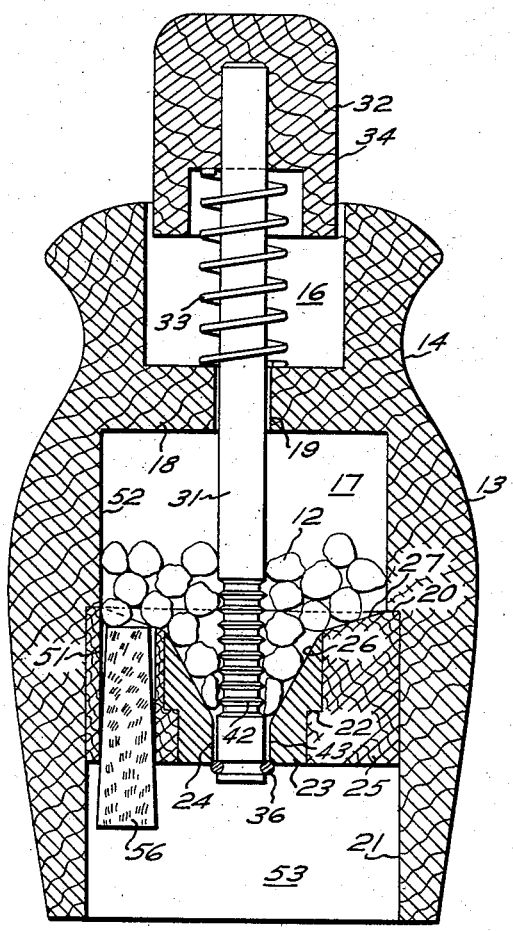
Figure 1 is a sectional view of the pepper mill of the present invention with the actuating plunger shown in its raised or normal position.

As hereinabove described, the pepper mill of the present invention is adapted to receive a quantity of peppercorns generally indicated by the numeral 12, and grind such peppercorns in accordance with demand for ground pepper particles and then dispense all of the ground particles from the bottom of the mill. With reference to the drawing, the mill includes a generally cylindrical body portion 13 preferably having an inwardly extending arcuate portion 14 for ready engagement by the fingers of the user. The upper end of the body is provided with a cylindrical recess 16 having an open upper end portion, and a similar downwardly extending recess 17 is provided opening at the bottom of the body. An inwardly extending shoulder 18 extends radially between the chambers or recesses 16 and 17, and communication is provided between such chambers by means of a bore 19 extending axially through the shoulder 18.

Figure 2:
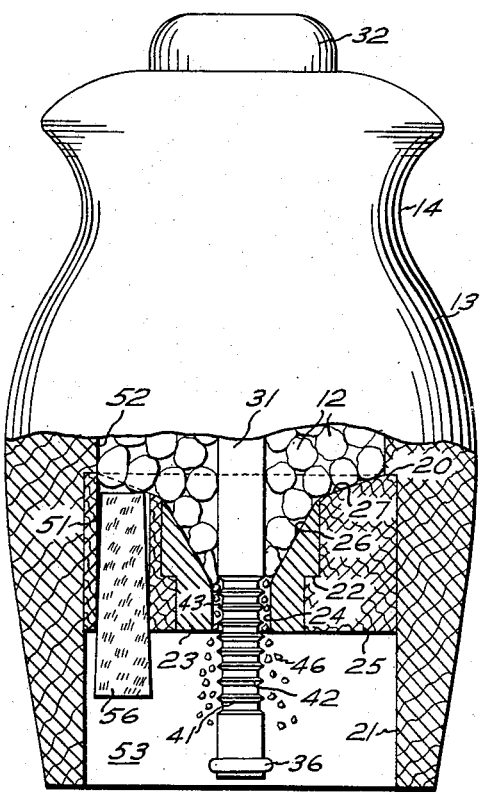
Figure 2 is a side elevational view, partly in section, but with the plunger shown in its depressed position.

Preferably, chamber 17 is provided with a radially enlarged shoulder 20 in which is seated a plug 25. The outer periphery of the plug is adapted to tightly engage the inner wall surface 21 of the chamber and the inner periphery thereof is stepped as indicated at 22 to provide a seat for a die member 23. While the body 13 and plug 25 may be formed of wood or any other suitable material, the die 23, which is locked to the plug is preferably formed of a harder material such as metal, and will be seen to include an axial passage extending therethrough, the lower portion 24 of the passage being cylindrical in form and the upper portion of the passage being of conical configuration as shown at 26. The upper end of the conical portion 26 of the die meets with the upper end of the plug 25, the upper surface 27 of the latter being preferably inclined radially downwardly whereby the peppercorns 12 will gravitationally flow towards and into the die passage when the mill is in its normal operative position as indicated in Figures 1 and 2 of the drawing.

Means are provided for shaving or grinding small particles of pepper from the peppercorns contained within the chamber 17 and as here shown includes a longitudinally extending metal plunger 31 which extends through the bore 19 in the shoulder and at its upper end is secured to a knob 32 for facilitating manual vertical reciprocation of the plunger. The plunger is normally maintained in a raised position by means of a spring 33 extending from the upper surface of shoulder 18 and bearing against a lower surface of the knob 32, the outer peripheral surface 34 of the knob being slightly spaced from the side walls of chamber 16 but normally contained within the length thereof. When the plunger is in its raised position, a stop member 36 extending circumferentially around the lower end of the plunger bears against the lower surface of the die 23 so as to limit the upward movement of the plunger. In assembling or disassembling the unit it is merely necessary to remove the stop ring 36 whereby the plunger and knob may be pulled upwardly and outwardly from the body.

The lower portion of plunger 31 is provided with a plurality of parallel and longitudinally spaced ribs 41 whose outer circumferential edges are preferably tapered as indicated in the drawing so as to define a plurality of spaced cutting edges. As will be seen from the drawing, the knife edges 42 formed at the outer periphery of the ribs are substantially coterminous with the outer periphery of the plunger itself and each is spaced from the walls defining the passage 24 so as to define therebetween an annular space 43 through which the ground pepper particles may pass. It is of the utmost importance that this lateral clearance between the plunger ribs and die be provided so that so long as the stop member 36 is spaced from the lower edge of the die, an unobstructed passage will be provided to permit all of the ground pepper particles to be discharged from the chamber. In absence of such clearance, and in accordance with most prior art devices, the plunger ribs were in immediate adjacency and in contact with the die passage so that a charge of ground pepper would be contained between adjacent ribs and not permitted to fall therefrom so long as such ribs were contained within the passage. However, by means of the annular space 43 between the rib periphery and the die passage, the ground pepper will always be totally discharged and there will be no danger of such particles remaining within the chamber and becoming stale or otherwise undesirable for use.

Figure 3:
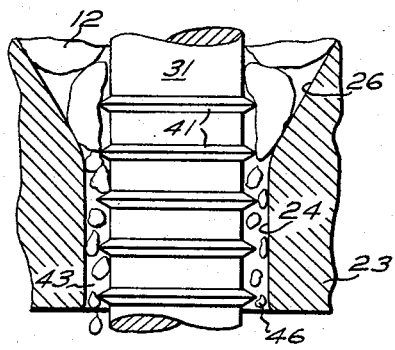
Figure 3 is an enlarged fragmentary view of a portion of the plunger and die structure.

The operation of the device should be apparent from a consideration of the above described constructional details. When it is desired to discharge pepper particles, such as those illustrated at 46 in Figures 2 and 3 of the drawing, It is only necessary to push downwardly on the knob 32, the latter effecting a similar downward movement of the plunger 31. As the plunger moves downwardly, the ribs 41, and more particularly the cutting edges 42 thereof, will shave or grind particles of pepper from the peppercorns contained within the conical portion 26 of the die, and such shavings, so long as stop member 36 is spaced from the die 23 will readily fall from annular passage 43 onto the article on which the pepper is to be dispensed. Then, upon release of the knob, spring 33 will return the plunger to its uppermost position wherein stop member 36 will effectively block the passage 43 and prevent any further dispensing of pepper particles. However, it will be appreciated that even during the upward movement of the plunger pepper particles may still be discharged and it is only upon the seating of stop member 36 that such discharge will be prevented.

It is also important to note that the only actual contact of the peppercorns is by the ribs 41 in conjunction with the stationary die member 23 and there will therefore be no crushing of excess pepper nor will there be any substantial resistance to the longitudinal reciprocation of the plunger. Also, by virtue of the annular space 43 between the plunger and die passage, as well as a substantial space between the plunger body and the bore 19, the plunger is capable of a limited amount of transverse or lateral movement. This greatly assists in the operation of the device as any tendency for jamming is precluded by permitting the plunger to move laterally and follow the path of least resistance through the peppercorns. Thus, not only is the device capable of easier operation but such lateral movement also results in smaller chips and better pepper grinding being effected.

Figure 4:
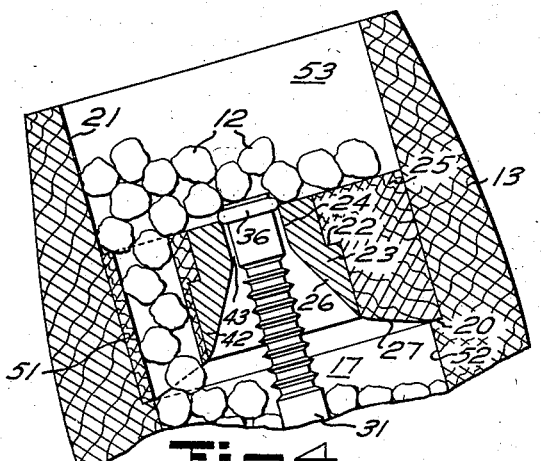
Figure 4 is an inverted view of the mill in condition for loading new peppercorns therein.

With particular reference to Figure 4 of the drawing, the improved peppercorn loading means is disclosed. As will be noted, plug 25 is provided with an axial passage 51 extending therethrough, such passage having a peripheral portion aligned with the side wall 52 of the peppercorn receiving chamber. By virtue of this passage, in order to load the chamber with a new charge of peppercorns, the mill may be inverted, and peppercorns poured into the radially enlarged distal end portion 53 of chamber 17 and deposited upon the normal lower surface of the plug and die. Then, it is only necessary for the operator to incline the body as shown in Figure 4 so as to cause the peppercorns to readily fall through the passage, and the side wall 21 of chamber 53 will readily guide such peppercorns through the passage and into chamber 17. To prevent removal of the peppercorns through the passage upon inversion of the body, a plug 56 is provided whose upper end is preferably coterminous and in general alignment with the surface 27 of the body plug.

From the foregoing description it will be appreciated that while the mill of the present invention is extremely simple in construction, it possesses novel features heretofore not found in comparable devices. By virtue of the omission of any lateral projections on the plunger body, there is no possibility of jamming the plunger upon downward movement thereof such as by pressing against a stack of vertically aligned peppercorns. Then, by reason of the annular passageway 43, it is possible to receive a full and complete charge of freshly ground pepper upon plunger actuation without danger of stale accumulated pepper being discharged upon initial opening of the passageway. Furthermore, the clearance between the plunger and/or the ribs thereof and the outer walls of the passage results in a slight lateral movement of the plunger so that it may more readily be actuated and insure an easier grinding of the peppercorns.

What is claimed is:

A device of the character described comprising a longitudinally extending body member, means adjacent one end of said body defining an open ended recess, means adjacent the other end of said body defining an open end recess, transversely extending means on said body separating said recesses and including an axial bore placing said recesses in communication, a plug member extending across said first mentioned recess medially of the ends thereof and including a metallic die member having a cylindrical substantially smooth walled passage aligned with said bore and a second portion of upwardly diverging configuration, said plug member having a second passage extending therethrough generally parallel to said die member passage and lying adjacent an axial wall of said first recess, removable closure means for said second passage, a plunger rod having a medial portion passing through said bore and a lower end portion within said die passage, spring means engageable with one surface of said transverse means normally urging said plunger in one direction, stop means limiting movement of said plunger and normally cooperating with a lower end portion of said plunger for blocking said die passage, said plunger having a plurality of radially extending sharpened ribs thereon of substantially equal radial extent, said ribs and said plunger periphery being radially spaced from said die passage so as to define an annular space therebetween.

References Cited in the file of this patent

UNITED STATES PATENTS

| | | |
|---|---|---|
| 1,208,099 | Cornell | Dec. 12, 1916 |
| 1,366,929 | Pasnik | Feb. 1, 1921 |
| 1,439,259 | Pasnik | Dec. 19, 1922 |
| 2,184,719 | Mantelet | Dec. 26, 1939 |
| 2,679,360 | Arni | May 25, 1954 |
| 2,683,566 | Bentley | July 13, 1954 |
| 2,698,719 | Heard | Jan. 4, 1955 |